US010878813B2

(12) United States Patent
Ray et al.

(10) Patent No.: US 10,878,813 B2
(45) Date of Patent: Dec. 29, 2020

(54) ANALYTICS-BASED SPEECH THERAPY

(71) Applicant: International Business Machines Corporation, Armonk, NY (US)

(72) Inventors: Shubhadip Ray, Secaucus, NJ (US); Gregory J. Boss, Saginaw, MI (US); Norbert Herman, Denver, CO (US); Andrew S. Christiansen, Dubuque, IA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 156 days.

(21) Appl. No.: 16/155,655

(22) Filed: Oct. 9, 2018

(65) Prior Publication Data

US 2020/0111488 A1    Apr. 9, 2020

(51) Int. Cl.
*G10L 15/22* (2006.01)
*G10L 15/18* (2013.01)
*G10L 15/30* (2013.01)
*G06F 3/01* (2006.01)
*G06F 3/16* (2006.01)
*G10L 15/24* (2013.01)

(52) U.S. Cl.
CPC .............. *G10L 15/22* (2013.01); *G06F 3/017* (2013.01); *G06F 3/167* (2013.01); *G10L 15/1815* (2013.01); *G10L 15/24* (2013.01); *G10L 15/30* (2013.01)

(58) Field of Classification Search
USPC ....... 704/235, 231, 244, 245, 250, 255, 257, 704/270, 270.1, 272, 277
See application file for complete search history.

(56) References Cited

U.S. PATENT DOCUMENTS

| 5,169,316 | A  | 12/1992 | Lorman |
| 5,794,203 | A  | 8/1998  | Kehoe |
| 6,714,911 | B2 | 3/2004  | Waryas |
| 6,732,076 | B2 | 5/2004  | Masterson |

(Continued)

FOREIGN PATENT DOCUMENTS

CN    103035135 B    4/2013

*Primary Examiner* — Qi Han

(74) *Attorney, Agent, or Firm* — Garg Law Firm, PLLC; Rakesh Garg; James Nock

(57) ABSTRACT

From a set of information obtained about a user, a profile is constructed representing a speech skill of the user, the set of information including audio, video, and demographic information of the user and other users, the constructing creating new data corresponding to the speech skill of the user in the profile. By correlating analytics of new real-time audio and video information with the new data in the profile, an intervention instruction is triggered automatically, the intervention being directed to change in a voice communication pattern of the user. The intervention is converted to an intervention instruction and the intervention instruction is output in a natural language form. New real-time audio and video information received in response to the spoken natural language instruction is analyzed. Responsive to the analyzing producing a change in a voice communication pattern of the user greater than a threshold change, a first state of the new data of the profile is modified to a second state in the profile.

20 Claims, 9 Drawing Sheets

(56) References Cited

U.S. PATENT DOCUMENTS

| | | | |
|---|---|---|---|
| 7,203,649 B1* | 4/2007 | Linebarger | G10L 15/18 |
| | | | 704/270 |
| 2007/0015121 A1* | 1/2007 | Johnson | G09B 7/04 |
| | | | 434/156 |
| 2007/0172805 A1 | 7/2007 | Paul | |
| 2008/0271590 A1 | 11/2008 | Lemons | |
| 2012/0116772 A1 | 5/2012 | Jones | |
| 2014/0278421 A1 | 9/2014 | Komissarchik | |
| 2017/0046973 A1* | 2/2017 | Kuddo | G09B 5/04 |
| 2017/0206691 A1 | 7/2017 | Harrises | |

* cited by examiner

ANALYTICS-BASED SPEECH THERAPY

TECHNICAL FIELD

The present invention relates generally to a method, system, and computer program product for speech therapy. More particularly, the present invention relates to a method, system, and computer program product for analytics-based speech therapy.

BACKGROUND

Many children's speech and language skills do not develop as quickly as their peers' skills. A child may show signs of a language or speech problem by, for example, not babbling, making only a few sounds, using gestures or pointing, saying only a few words, or not putting multiple words together at age-appropriate times. Children may also have difficulty articulating certain sounds at age-appropriate times (for example, not saying p, b, m, h, and w correctly at 1-2 years old, or not saying k, g, f, t, d, and n correctly at 2-3 years old). Other children may find it difficult to speak fluently without stuttering, or need help using words to communicate at all.

SUMMARY

The illustrative embodiments provide a method, system, and computer program product. An embodiment includes a method that constructs, from a set of information obtained about a user, a profile representing a speech skill of the user, the set of information including audio, video, and demographic information of the user and other users, the constructing creating new data corresponding to the speech skill of the user in the profile. An embodiment triggers automatically, by correlating analytics of new real-time audio and video information with the new data in the profile, an intervention instruction, the intervention being directed to change in a voice communication pattern of the user. An embodiment converts the intervention and outputs the intervention instruction in a natural language form. An embodiment analyzes new real-time audio and video information received in response to the spoken natural language instruction. An embodiment modifies, responsive to the analyzing producing a change in a voice communication pattern of the user greater than a threshold change, a first state of the new data of the profile to a second state in the profile.

An embodiment includes a computer usable program product. The computer usable program product includes one or more computer-readable storage devices, and program instructions stored on at least one of the one or more storage devices.

An embodiment includes a computer system. The computer system includes one or more processors, one or more computer-readable memories, and one or more computer-readable storage devices, and program instructions stored on at least one of the one or more storage devices for execution by at least one of the one or more processors via at least one of the one or more memories.

BRIEF DESCRIPTION OF THE DRAWINGS

Certain novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

Figure 1:
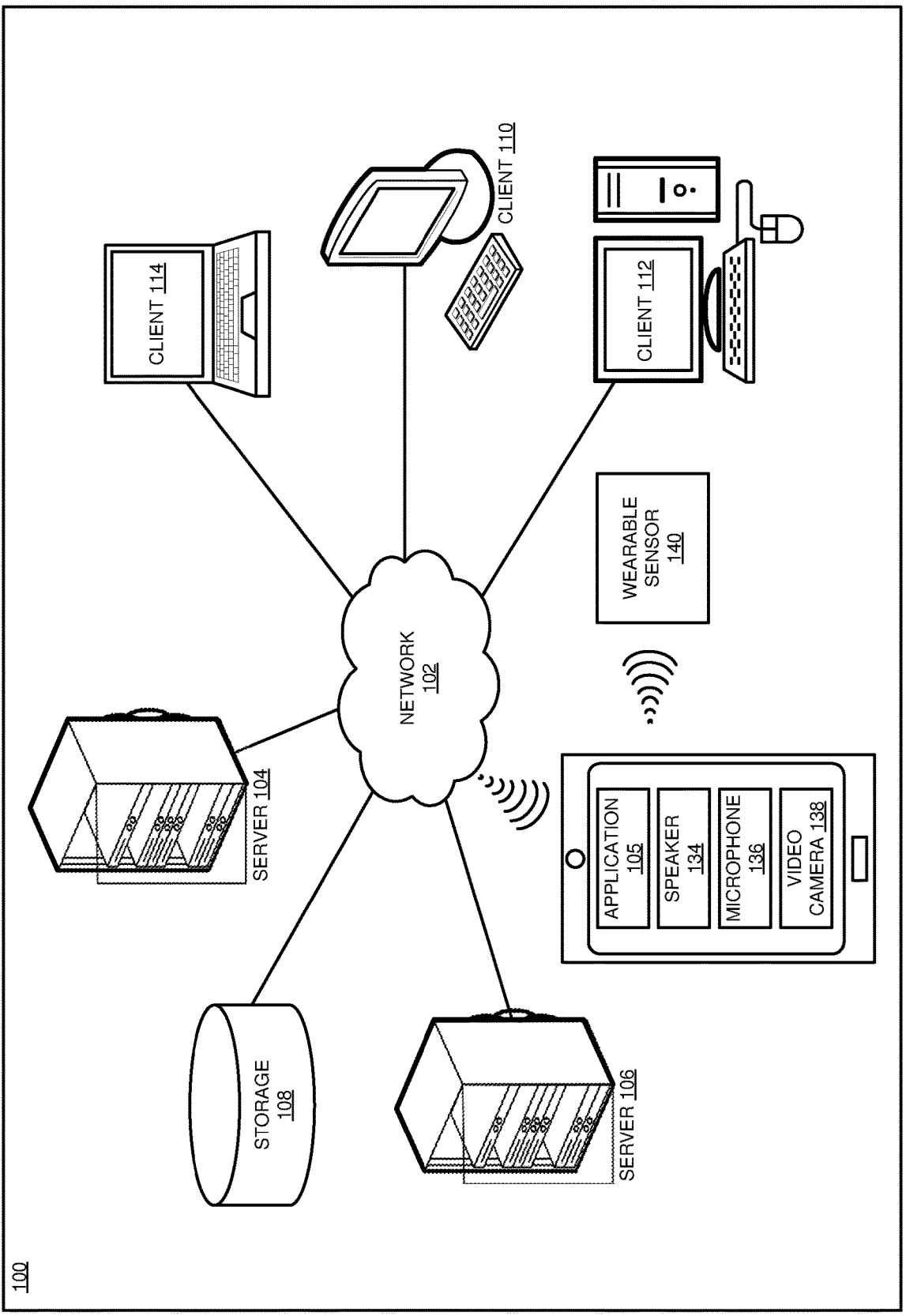
FIG. 1 depicts a block diagram of a network of data processing systems in which illustrative embodiments may be implemented.

Speech therapists and similar professionals work with children having speech and language difficulties. During therapy sessions, therapists evaluate their child patients and introduce exercises to improve patients' difficulties. However, much as homework in a school setting provides needed skills practice, speech therapy exercises also require extensive practice outside sessions. Children often need to be prompted and encouraged to perform such practice, requiring extensive one-to-one time with a parent or caregiver. Parents and caregivers also have other responsibilities, and often do not have the requisite one-to-one time. As well, not all parents have the education, training, temperament, and skills to help their children. Accordingly, a software-based system is needed to supplement parents and caregivers in supporting a child's speech therapy.

The illustrative embodiments recognize that the presently available tools or solutions do not address these needs or provide adequate solutions for these needs. The illustrative embodiments used to describe the invention generally address and solve the above-described problems and other problems related to analytics-based speech therapy.

An embodiment can be implemented as a software application. The application implementing an embodiment can be configured as a modification of an existing speech therapy system, as a separate application that operates in conjunction with an existing speech therapy system, a standalone application, or some combination thereof.

Particularly, some illustrative embodiments provide a method by which a child's communication attempts can be corrected, encouraged, and improved in real-time, using analytical methods, to improve the child's communication skills. An operation, event, action, information, or response, said to be occurring in real-time or near-real-time, occurs as close as possible in time to a related or different operation, event, action, information, or response, within the constraints of technological limitations and while discounting any delays caused by technological or environmental factors, such as but not limited to transmission or propagation period or data processing delays. A real-time component, also referred to as a near-real-time component, is a component that performs or otherwise relates to a real-time operation, event, action, information, or response.

To begin, an embodiment builds an analytics based profile of the subject, typically a child. To obtain data from which to build the profile using analytics, an embodiment employs video and audio monitoring to obtain data regarding the child's gestures, speech, and other interactions with others. Optionally, an embodiment also uses movement sensors, either worn by the child or positioned on objects in the child's environment, to collect further data regarding the child's gestures and other movements. For example, a pre-verbal child may point at an object or reach for it, instead of asking for the object with spoken words.

An embodiment continues the video, audio, and optional movement sensor monitoring at least until the embodiment has obtained a sufficient amount of this type of data with which to derive analytics to construct a profile. An embodiment may conduct the monitoring using any suitable device, for example using a smartphone or tablet computer near the child, or a device affixed to a room in the child's environment and configured to monitor the entire environment (such as a monitoring system for continuous monitoring of a school classroom or daycare environment). In addition, if data is conveniently available, an embodiment continues to monitor the child to refine the profile, assess progress, and tune later interactions with the child. For example, if the child interacts with an embodiment through an application running on a tablet computer, the embodiment could continue to monitor the child while he or she is interacting with the application, or other applications on the tablet computer. Similarly, if the child is in an environment with constant monitoring (such as a school or daycare), an embodiment could continue to monitor the child during all the times the child is within the monitored environment, or regularly monitor smaller segments of time—perhaps an hour once a day. In any case such monitoring typically encompasses a longer baseline for behavior observation than is available in a typical one-hour speech therapy session with a professional, but using devices that are likely already present in the child's environment.

An embodiment uses a variety of known techniques to analyze the audio and video data. For example, an embodiment uses commercially available visual recognition techniques to analyze still images for scenes, objects, faces, colors, food, and other items. An embodiment uses commercially available visual recognition techniques to analyze sequences of video to recognize, for example, gestures and facial expressions and track individuals in an environment. An embodiment uses commercially available speech to text techniques, then applies commercially available natural language processing, classifying techniques and sentiment analysis to the resulting text, to recognize words, concepts, emotions, and sentiment in the speech.

The embodiment also collects additional demographic data for use in constructing the profile. Non-limiting examples of such data include the child's gender and age, the language or set of languages the child communicates in, the language(s) and accents the people close to the child (such as teachers or parents) communicate in, as well as the culture the child belongs to. In addition, if available, such data also includes health data of the child and information regarding the speech acquisition history of the child's parents. An embodiment collects such data by requesting it via a user interface, through access to stored health records, by inference from the collected video and audio data, or by any other suitable means.

Using the demographic data, as well as results from analyzing the audio, video, and optional movement data, an embodiment constructs an analytics based profile of the subject.

Once an embodiment has constructed a profile for the child, the embodiment uses clustering analysis to cluster the profile with other profiles for similar children. The embodiment performs this clustering analysis using any suitable clustering analysis technique—for example, k-means clustering. Performing this analysis allows an embodiment to compare a subject child, as his or her speech develops, with the development of similarly-situated children, aiding in progress assessment for this child. The embodiment augments the constructed profile with an exploratory factor analysis, to identify additional factors that could be important in this particular child's speech development, by finding all relevant factors for the cluster stored in the system and hence associated with the child, and exploring new factors which may be relevant to the cluster and the child. For example, one such factor could be that the accent of this child appears to be a variation from a norm known to the embodiment.

An embodiment also asks a user—such as the child, or a parent or caregiver—to audio and video record a 360 degree view of the child's current environment. Using the same audio and video analysis and classification techniques described herein, the embodiment determines environmental context information. Environmental context information includes categories such as the physical objects, lighting, people, and sounds in the child's environment. Such information can include, for example, that the child is in his or her playroom at home, with two toys on a table in the corner, a collection of wooden bricks of various sizes in the middle of the room on a colorful rug on the floor, and a play kitchen set along a wall. The embodiment uses this information to understand the items the child is interacting with.

An embodiment continues the video, audio, and optional movement sensor monitoring and related analysis correlated with the environmental context information, while the child interacts with the embodiment. An embodiment performs such correlation using any suitable statistical correlation technique. In particular, a virtual agent processor component of the embodiment determines whether the child is attempting to speak words, or only using movements, gestures, and non-word sounds. If the child is not attempting to speak words, the embodiment encourages the child to speak words, based on the child's movements and gestures, similar to the way a parent or caregiver would. For example, if the child is pointing to a toy she cannot reach on a table and making "ah, ah" sounds, the embodiment might tell the child, using voice, "That's a toy! Can you say 'toy'?" If the child responds by saying "toy", the embodiment might respond with, "Good job!" or "That's great!" If the child responds by saying sounds that the embodiment classifies as an attempt at saying "toy", the embodiment might respond with, "That's a really good try! Can you say 'toy' again?" However, if the child responds by crying, or makes other sounds of distress, the embodiment might cease attempting to encourage the child to speak words, but instead alert a caregiver that the child is in distress.

The embodiment conducts conversations using a commercially-available machine learning-based text conversation service, coupled with commercially-available speech-to-text and text-to-speech services as necessary. During implementation of the embodiment, such a machine learning-based text conversation service is initialized with a basic set of dialogs the embodiment is likely to have with any child. The embodiment supplements the information gained from the conversation service with information from a commercially-available tone analysis service, to detect an emotional state of the child. For example, if the child is growing too frustrated or upset, further practice will likely be counter-productive, and the embodiment can cease encouraging the child to practice until the child is calmer. The embodiment also supplements the conversation service with knowledge of which known objects are in the child's environment, and where they are in the environment, using common video analysis and image recognition techniques. An embodiment includes a virtual agent processor and a virtual agent trainer.

If the child is attempting to speak words, the embodiment determines if the detected audio corresponds to the child's gestures or movements. If yes, the embodiment uses current audio and video monitoring of the child, in conjunction with the conversation service, to ask the child a follow-up question. For example, if the child is pointing at a wooden block, and said sounds the embodiment interpreted as "bock" (missing the "l" sound), the embodiment could respond with, "That was a really good try! Can you say 'block' again?", perhaps overemphasizing the "l" sound to help the child grasp the correct pronunciation. However, if the detected audio does not correspond to the child's gestures or movements, the embodiment uses current video monitoring of the child, in conjunction with the conversation service, to determine what the child is pointing at and ask the child a related question. For example, if the child is pointing at a wooden block, but saying sounds the embodiment interpreted as not sufficiently close to "block", the embodiment could respond with, "Yes, that's a block. Can you say 'block'?" to help the child practice saying the word.

An embodiment continues to interact with the child in this manner, either in an extension of one session or in multiple sessions over days, weeks, or months. Based on learned patterns of typical conversations, with both this child and others, and pronunciations of this child or children with similar profiles, the embodiment identifies what the child is trying to say, and encourages the child to further practice saying that word or phrase correctly.

An embodiment also incorporates practice sessions. For example, a human speech therapist will often diagnose a pronunciation difficulty, then give a child or caregiver a set of practice words or phrases designed to help the child correct the difficulty. For example, for a child who has trouble differentiating "s" and "sh" sounds, the phrase "she sells seashells by the seashore" might help the child practice this differentiation. An embodiment can also determine, based on speech to text conversion coupled with natural language processing of the child's sentences and other context, that the child has such a problem, and determine that appropriate practice sessions are necessary. A human therapist may also configure or train an embodiment directly to conduct practice sessions with the child. Here, the embodiment prompts the child to practice, for example saying, "Let's practice some 's' words! Can you say 'seashore'? If the child responds correctly, the embodiment praises the child, then suggests another practice word. If the child does not respond correctly, the embodiment corrects the child and encourages him or her to try again.

The scenarios described do not require the child to interact with a display screen of the embodiment. Instead, the embodiment monitors the child and his or her surroundings and interacts with the child by voice.

Another embodiment uses a display screen of the embodiment to interact with the child, as well as using voice. For example, an embodiment can use a display screen to display a list of practice words, or use relevant videos and images superimposed to create an augmented reality environment for a child who already knows how to read. As another example, if the embodiment determines that a child is having difficulty with the "th" sound, the embodiment could display a diagram of a mouth and tongue in the correct place, and tell the child, "Try putting your tongue here, and say 'thing', to help the child place her tongue in the correct location to make the sound correctly.

An embodiment uses the display screen to implement an augmented reality environment to supplement the child's physical environment. For example, if the child says a word similar to "ball", but a ball is not physically present near the child, the embodiment could display a scene of the child playing with a ball in his home or daycare environment and say "Do you want to play with the ball? Say 'ball'."

As an embodiment continues to interact with a child, the embodiment also computes one or more scores for the child's speech skills with respect to corresponding skills of other children having similar profiles, with similarly-profiled children being determined using cluster analysis. An embodiment computes an overall score representing a composite of all of a child's speech-related skills. Another embodiment computes a set of scores, each representing one of a child's speech-related skills. Another embodiment computes both a set of scores and an overall score. Currently-used methods typically compare children with speech or language difficulties against other children who do not have difficulties. As a result, even though a child with a difficulty may be improving, he or she will still be scored lower than a child without a difficulty, and such a continued lower score could be discouraging. Instead, by comparing against other children who have similar problems, an embodiment readily shows that one child is improving faster than his or her peers, another child is improving but at a slower rate than his or her peers, while a third child is not improving at all.

As an embodiment continues to interact with a child, the embodiment uses the interactions to refine the child's profile. For example, as the child develops, she may no longer have difficulty speaking words, but have trouble with specific words or sounds. Another child may be learning a second language, but have difficulty with certain sounds that are only present in the second language. The embodiment also uses feedback from parents, caregivers, therapists, and other associates of the child to refine the child's profile. The embodiment re-performs the cluster analysis, augmented with an additional exploratory factor analysis to refine the originally-identified clusters and identify new factors that may affect the child's development.

An embodiment also reports scores and guidance to the child's parents, teachers, speech therapists, and other caregivers, to help these others encourage the child to practice and improve his or her skills without direct interaction with the embodiment. For example, if an embodiment determines that a child has trouble with "th" sounds, the embodiment could report this to the child's parents and generate a set of practice words or phrases for the parents and child to practice together. Many parents want to limit their child's screen time or time spent interacting with automated systems, and a means of offline interaction, with appropriate guidance, is a useful supplement to an embodiment's normal mode of operation.

An embodiment also collects feedback from parents, caregivers, therapists, and other users. The embodiment uses this feedback, as well as user profile updates and similarly-profiled users' responses to similar interventions, to update the scoring model and intervention rules corresponding to profile clusters and add additional relevant factors to user profiles.

An embodiment stores information relating to the embodiment's interactions with a child. As the child's speech skills improve, scores representing those skills, and optionally sample audio and video recordings of the child's skills with derived analytics, are saved in a database storing progress records. An embodiment includes spectral patterns of correct speech, to be used when comparing to audio of the child's. An embodiment includes a database with video samples of correct pronunciation, both to compare to video of the child and optionally to provide instructions to the child or his or her parents or caregivers regarding a specific pronunciation. An embodiment includes a database of audio and video samples of the child's parents or caregivers' pronunciation, referenced when generating audio and video instructions and steps to create augmented reality based on the profile and real-time contextual parameters. An embodiment also includes a database of words and corresponding audio, video, and written patterns, for use in generating practice words, comparing objects to words, encouraging the child to say a word corresponding to an object, displaying text referencing the object, generating practice words, and similar uses.

Although described herein with respect to a child user, the illustrative embodiments encompass adult users as well. Any user, including an adult, can use an embodiment to improve his or her speech skills. For example, an embodiment is adapted to assist an adult user in learning a new language, change an accent, remove an accent, or modify or improve other speech or language skills.

The manner of analytics-based speech therapy described herein is unavailable in the presently available methods. A method of an embodiment described herein, when implemented to execute on a device or data processing system, comprises substantial advancement of the functionality of that device or data processing system in analyzing a user's speech, interacting with the user to improve speech difficulties, and refining a model representing the user's speech skills as the skills improve.

The illustrative embodiments are described with respect to certain types of analyses, cluster analyses, exploratory factor analyses, interactions, conversational prompts, responses, thresholds, rankings, scores, adjustments, sensors, measurements, devices, data processing systems, environments, components, and applications only as examples. Any specific manifestations of these and other similar artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 2:
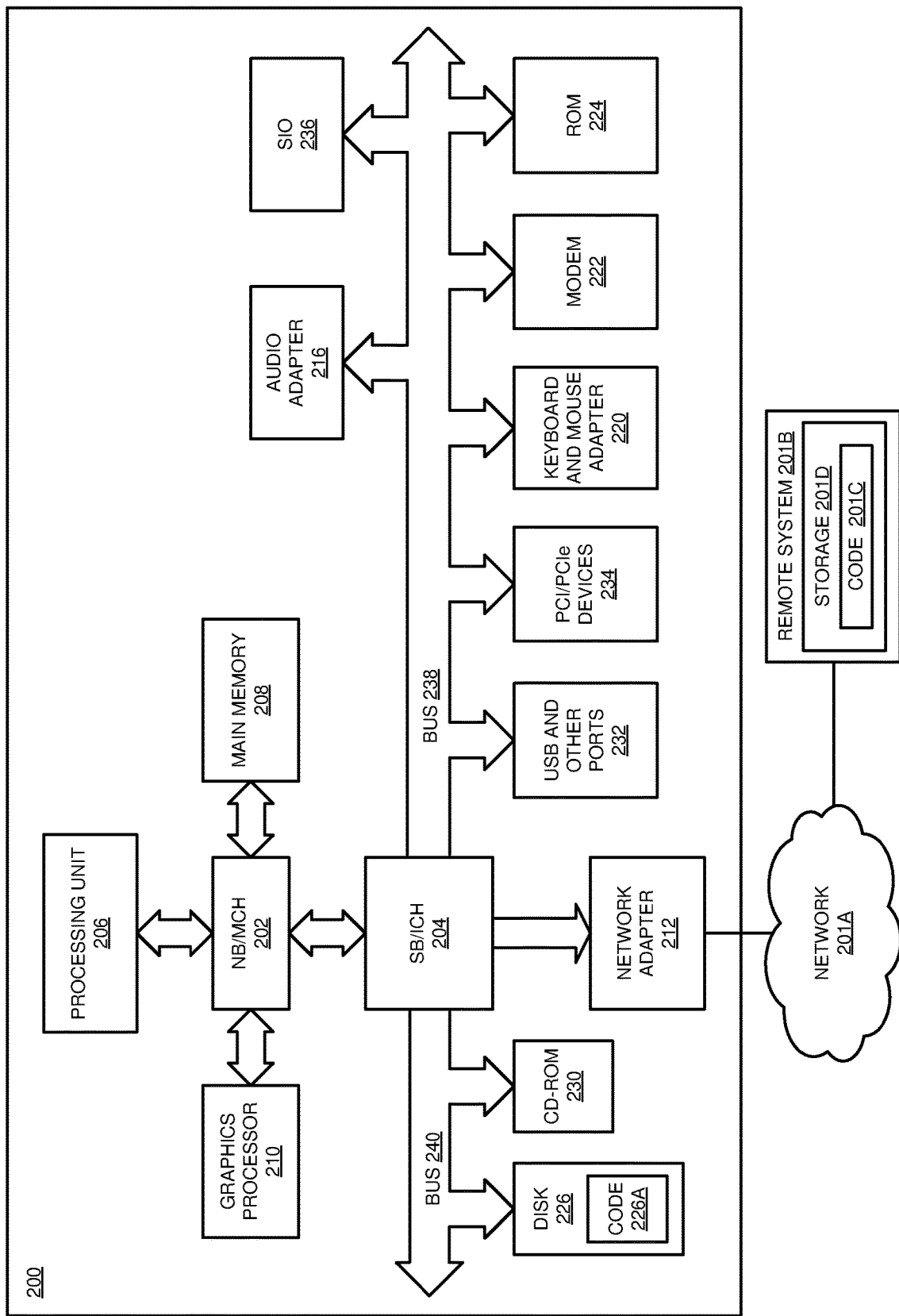
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Server 104 and server 106 couple to network 102 along with storage unit 108. Software applications may execute on any computer in data processing environment 100. Clients 110, 112, and 114 are also coupled to network 102. A data processing system, such as server 104 or 106, or client 110, 112, or 114 may contain data and may have software applications or software tools executing thereon.

Only as an example, and without implying any limitation to such architecture, FIG. 1 depicts certain components that are usable in an example implementation of an embodiment. For example, servers 104 and 106, and clients 110, 112, 114, are depicted as servers and clients only as example and not to imply a limitation to a client-server architecture. As another example, an embodiment can be distributed across several data processing systems and a data network as shown, whereas another embodiment can be implemented on a single data processing system within the scope of the illustrative embodiments. Data processing systems 104, 106, 110, 112, and 114 also represent example nodes in a cluster, partitions, and other configurations suitable for implementing an embodiment.

Device 132 is an example of a device described herein. For example, device 132 can take the form of a smartphone, a tablet computer, a laptop computer, client 110 in a stationary or a portable form, a wearable computing device, or any other suitable device. Any software application described as executing in another data processing system in FIG. 1 can be configured to execute in device 132 in a similar manner. Any data or information stored or produced in another data processing system in FIG. 1 can be configured to be stored or produced in device 132 in a similar manner. Device 132 includes speaker 134, microphone 136, and video camera 138. Device 132 also communicates with wearable sensor 140 via any suitable form of wired or wireless communication.

Application 105 implements an embodiment described herein. Application 105 executes in device 132 or any other suitable location, such as servers 104 and 106, and clients 110, 112, and 114.

Servers 104 and 106, storage unit 108, and clients 110, 112, and 114, and device 132 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications. Data processing environment 100 may also take the form of a cloud, and employ a cloud computing model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service.

With reference to FIG. 2, this figure depicts a block diagram of a data processing system in which illustrative embodiments may be implemented. Data processing system 200 is an example of a computer, such as servers 104 and 106, or clients 110, 112, and 114 in FIG. 1, or another type of device in which computer usable program code or instructions implementing the processes may be located for the illustrative embodiments.

Data processing system 200 is also representative of a data processing system or a configuration therein, such as data processing system 132 in FIG. 1 in which computer usable program code or instructions implementing the processes of the illustrative embodiments may be located. Data processing system 200 is described as a computer only as an example, without being limited thereto. Implementations in the form of other devices, such as device 132 in FIG. 1, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG.

2. The operating system may be a commercially available operating system for any type of computing platform, including but not limited to server systems, personal computers, and mobile devices. An object oriented or other type of programming system may operate in conjunction with the operating system and provide calls to the operating system from programs or applications executing on data processing system 200.

Instructions for the operating system, the object-oriented programming system, and applications or programs, such as application 105 in FIG. 1, are located on storage devices, such as in the form of code 226A on hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

Furthermore, in one case, code 226A may be downloaded over network 201A from remote system 201B, where similar code 201C is stored on a storage device 201D. In another case, code 226A may be downloaded over network 201A to remote system 201B, where downloaded code 201C is stored on a storage device 201D.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Where a computer or data processing system is described as a virtual machine, a virtual device, or a virtual component, the virtual machine, virtual device, or the virtual component operates in the manner of data processing system 200 using virtualized manifestation of some or all components depicted in data processing system 200. For example, in a virtual machine, virtual device, or virtual component, processing unit 206 is manifested as a virtualized instance of all or some number of hardware processing units 206 available in a host data processing system, main memory 208 is manifested as a virtualized instance of all or some portion of main memory 208 that may be available in the host data processing system, and disk 226 is manifested as a virtualized instance of all or some portion of disk 226 that may be available in the host data processing system. The host data processing system in such cases is represented by data processing system 200.

Figure 3:
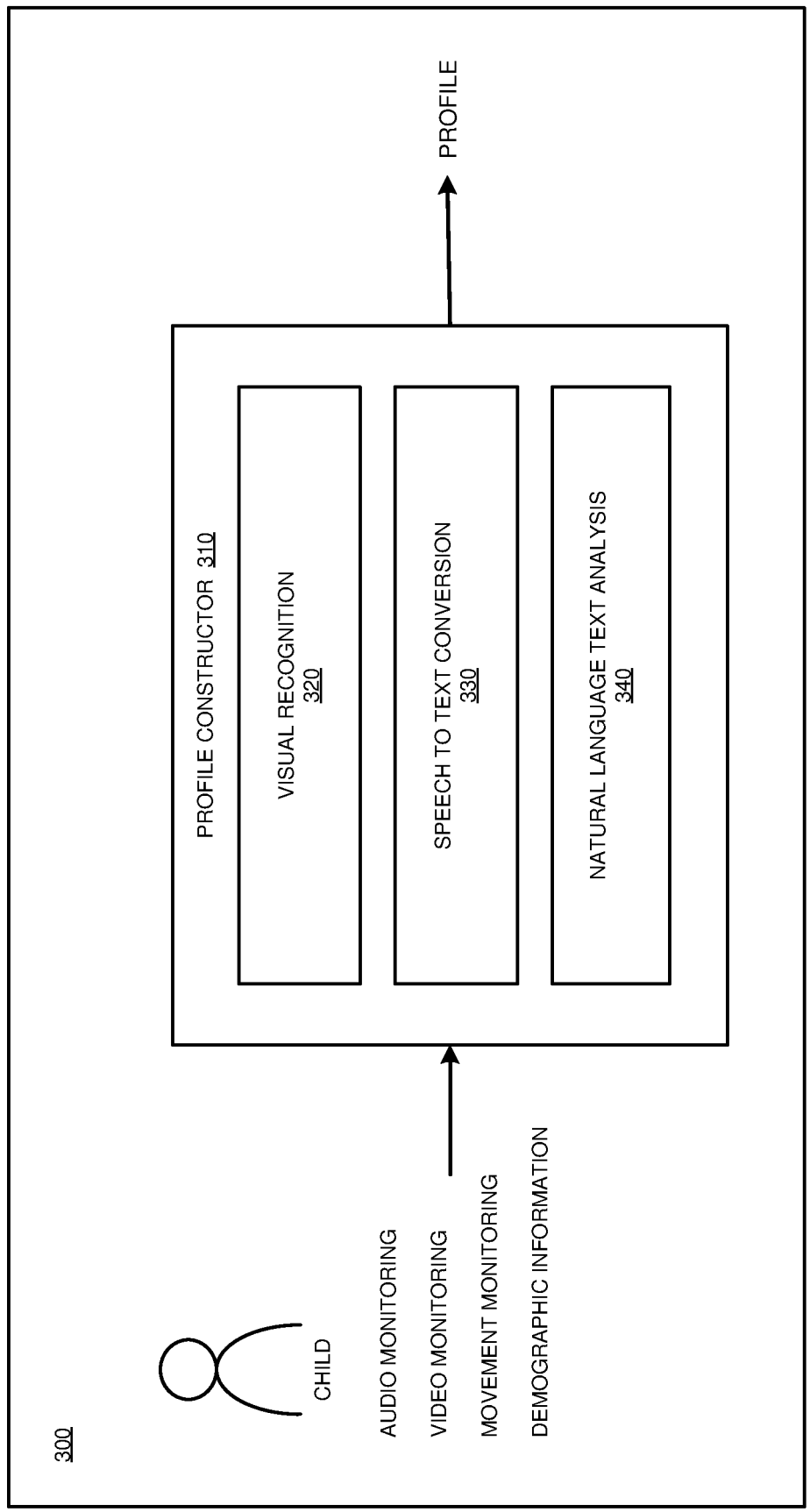
FIG. 3 depicts a block diagram of a profile construction portion of an example configuration for analytics-based speech therapy in accordance with an illustrative embodiment.

With reference to FIG. 3, this figure depicts a block diagram of a profile construction portion of an example configuration for analytics-based speech therapy in accordance with an illustrative embodiment. Application 300 is an example of application 105 in FIG. 1 and executes in device 132 in FIG. 1.

In FIG. 3, video, audio, and optional movement sensor monitoring, as well as demographic information, feed into profile constructor 310. Profile constructor 310 performs visual recognition analysis 320 to analyze video images for scenes, objects, faces, colors, food, and other items, and analyzes sequences of video to recognize, for example, gestures and facial expressions and track individuals in an environment. Profile constructor 310 also performs speech to text conversion 330 to convert the subject's speech to text, then performs natural language text analysis 340 to the resulting text, to recognize words, concepts, emotions, and sentiment in the speech. The output of profile constructor 310 is a profile for the subject child.

Figure 4:
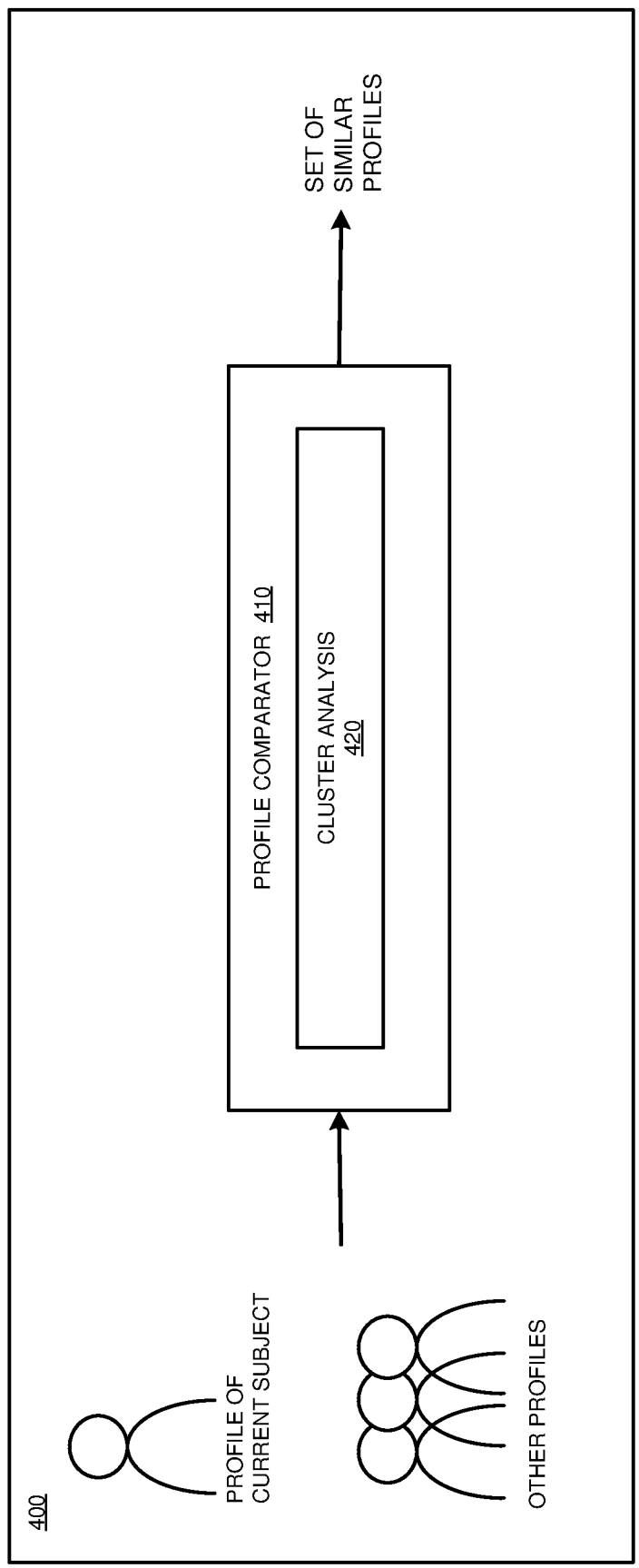
FIG. 4 depicts a block diagram of a profile comparator portion of an example configuration for analytics-based speech therapy in accordance with an illustrative embodiment.

With reference to FIG. 4, this figure depicts a block diagram of a profile comparator portion of an example configuration for analytics-based speech therapy in accordance with an illustrative embodiment. Application 400 is an example of application 105 in FIG. 1 and executes in device 132 in FIG. 1.

In FIG. 4, profile comparator 410 performs clustering analysis 420 on the profile of the current subject, as well as other profiles constructed in a similar manner, to determine a set of profiles that are similar to the current profile. Performing this analysis allows an embodiment to compare this child, as his or her speech develops, with the development of similarly-situated children, aiding in progress assessment for this child. Clustering analysis 420 also includes an exploratory factor analysis to identify additional factors that could be important in this particular child's speech development.

Figure 5:
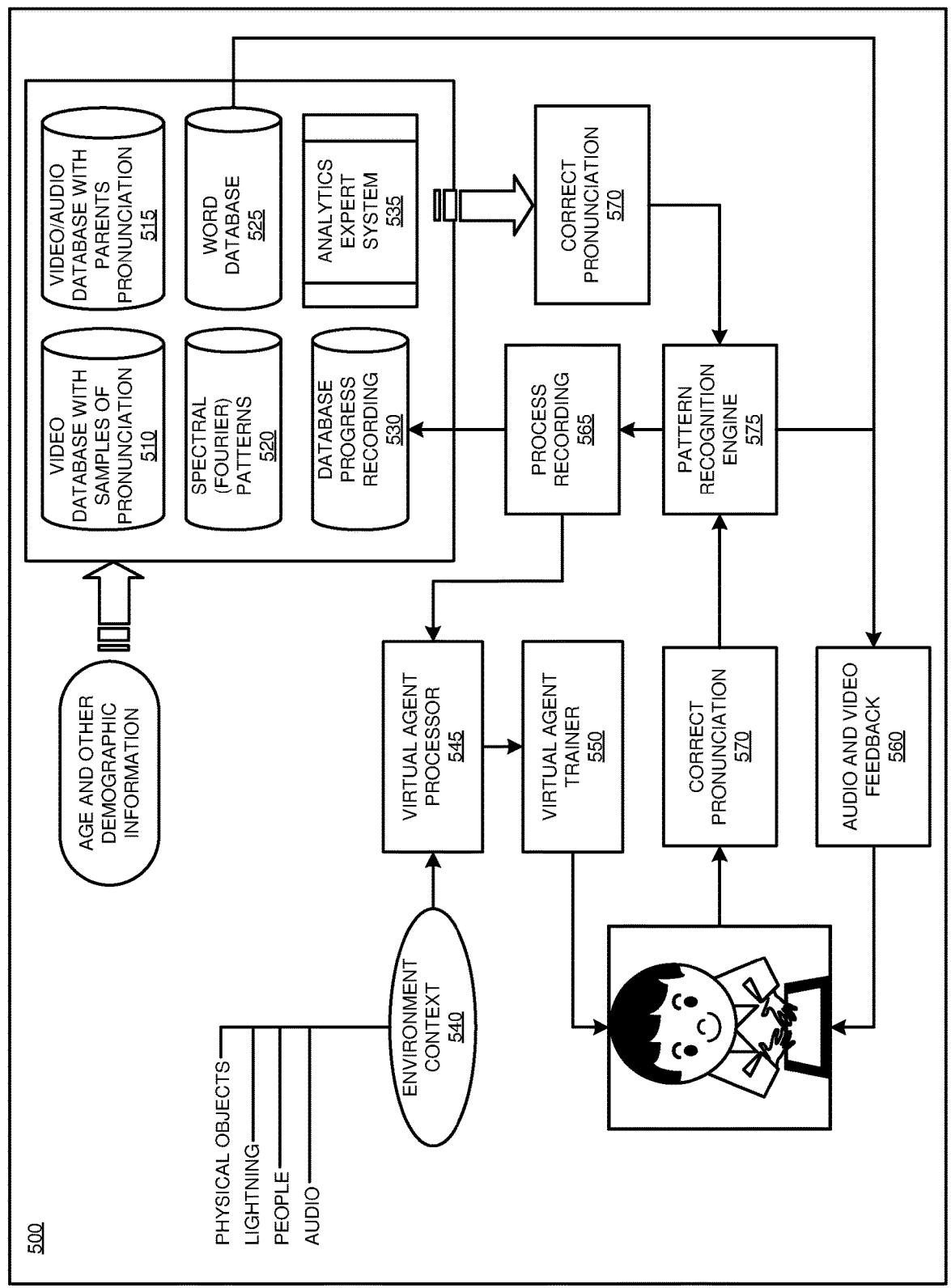
FIG. 5 depicts a flow diagram of an example configuration for analytics-based speech therapy in accordance with an illustrative embodiment.

With reference to FIG. 5, this figure depicts a flow diagram of an example configuration for analytics-based speech therapy in accordance with an illustrative embodiment. Application 500 executes in device 132 in FIG. 1.

In particular, FIG. 5 depicts the flow of information between components of application 500, while interacting with a child to perform analytics-based speech therapy. Application 500 incorporates the child's profile data, such as the child's gender and age, the language or set of languages the child communicates in, the language(s) the people close to the child (such as teachers or parents) communicate in, as well as the culture the child belongs to. In addition, if available, such data also includes health data of the child and information regarding the speech acquisition history of the child's parents.

Application 500 also incorporates storage for information relating to the application's interactions with a child. The application includes database 510 storing video samples of correct pronunciation, both to compare to video of the child and optionally to display instructions to the child regarding a specific pronunciation. The application includes database 515 storing audio and video samples of the child's parents or caregivers' pronunciation, referenced when generating audio and video instructions and steps to create augmented reality based on the profile and real-time contextual parameters. The application includes database 520 storing spectral patterns of correct speech, to compare to audio of the child's speech. The application also includes database 525 storing words and corresponding audio, video, and written patterns, for use in generating practice words, comparing objects to words, encouraging the child to say a word corresponding to an object, displaying text referencing the object, generating practice words, and similar uses. As the child's speech skills improve, scores representing those skills, and optionally sample audio and video recordings of the child's skills, are saved in progress recording database 430.

The application also includes analytics expert system 535, which provides information to correct pronunciation module 570. The application also includes environmental context module 540, which collects environmental context information including the physical objects, lighting, people, and sounds in the child's environment. Environmental context information feeds into virtual agent processor 540 and thence to virtual agent trainer 550 and the child. Virtual agent processor 540 processes the real-time information received from the child's environment and the actions of the child and determines next steps of the interaction with the child. Virtual agent trainer 550 implements an augmented reality environment to supplement the child's physical environment. For example, if the child says a word similar to "ball", but a ball is not physically present near the child. Virtual agent trainer 550 could display a scene of the child playing with a ball and reference the virtual ball instead of a physical ball.

When the child speaks, child pronunciation module 555 receives the speech and passes it on to pattern recognition engine 575. Pattern recognition engine 575 compares the child's pronunciation with information on correct pronunciation received from correct pronunciation module 570, and passes the results on to progress recording module 565 and thence to progress recording database 530. Pattern recognition engine 575 also passes information on to audio/video feedback module 560. Audio/video feedback module 560 also receives information from database 525 such as words and corresponding audio, video, and written patterns, for use in generating practice words, comparing objects to words, encouraging the child to say a word corresponding to an object, displaying text referencing the object, generating practice words, and similar uses.

Figure 6:
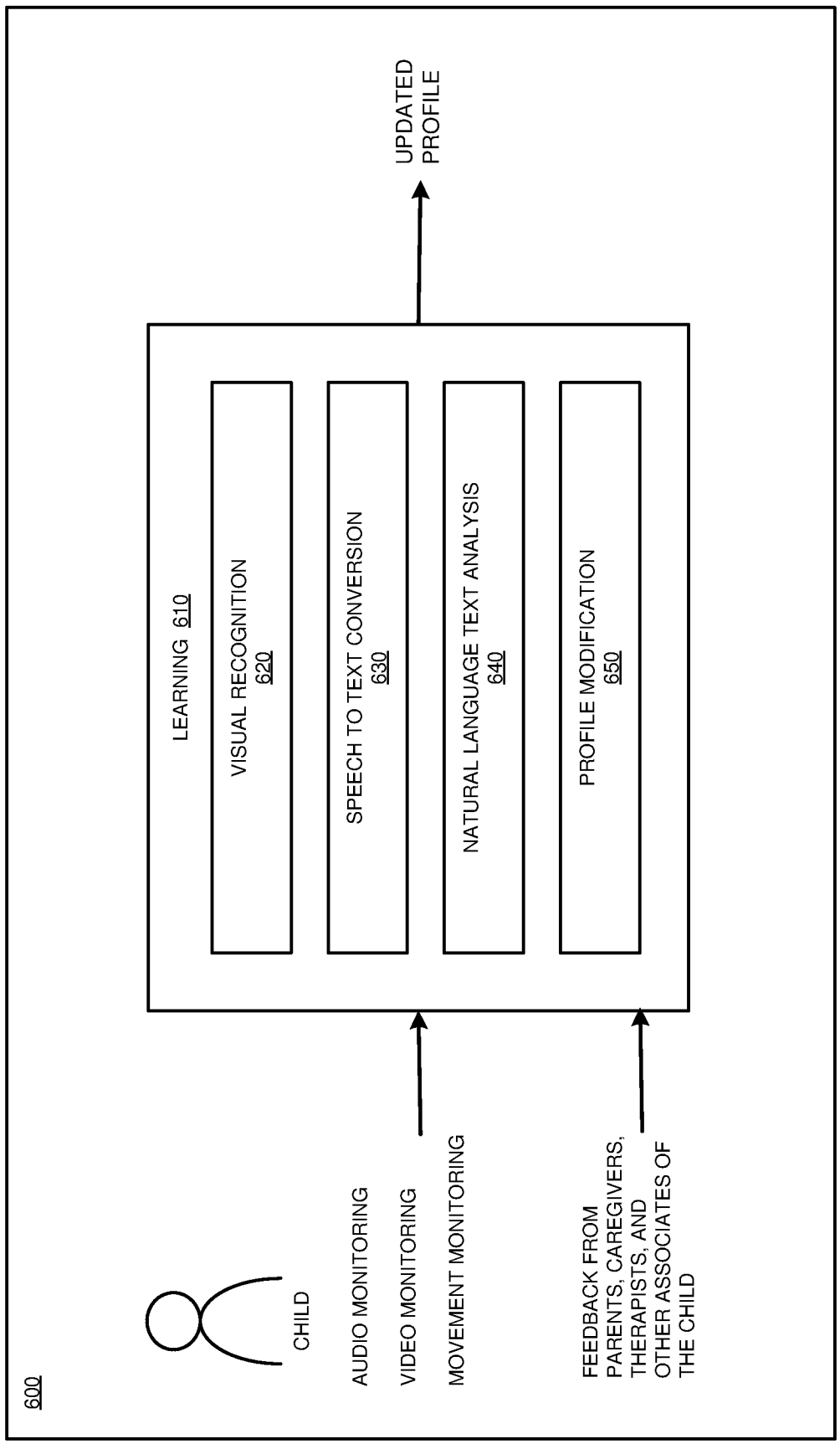
FIG. 6 depicts a block diagram of a learning portion of an example configuration for analytics-based speech therapy in accordance with an illustrative embodiment.

With reference to FIG. 6, this figure depicts a block diagram of a learning portion of an example configuration for analytics-based speech therapy in accordance with an illustrative embodiment. Application 600 is an example of application 105 in FIG. 1 and executes in device 132 in FIG. 1.

In FIG. 6, learning module 610 includes visual recognition module 620, speech to text conversion module 630, natural language text analysis module 640, and profile modification module 650. Application 600 shares portions of code with application 300 in FIG. 3, and visual recognition module 620, speech to text conversion module 630, and natural language text analysis module 640 are the same as visual recognition module 320, speech to text conversion module 330, and natural language text analysis module 340 in FIG. 3. In particular, profile modification module 650 uses ongoing interactions with the child, as well as feedback from parents, caregivers, therapists, and other associates of the child, to refine the child's profile.

Figure 7:
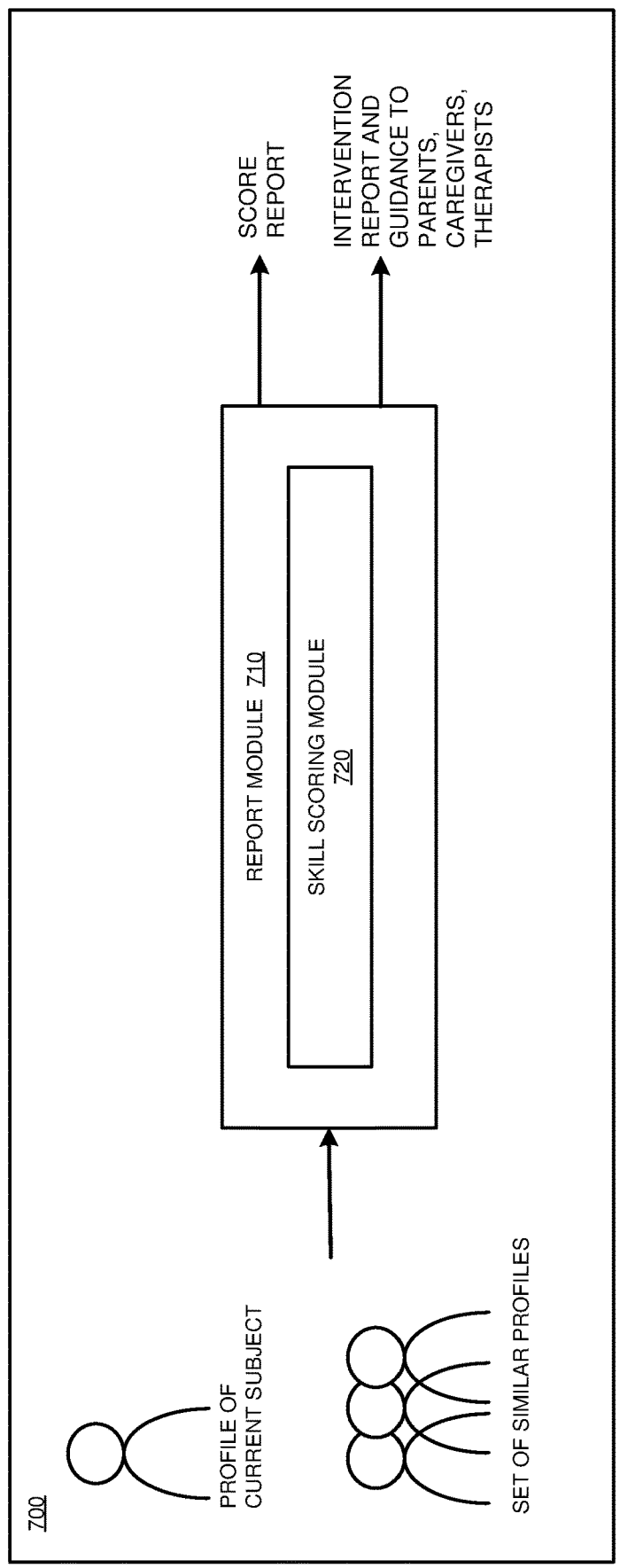
FIG. 7 depicts a block diagram of a report module portion of an example configuration for analytics-based speech therapy in accordance with an illustrative embodiment.

With reference to FIG. 7, this figure depicts a block diagram of a report module portion of an example configuration for analytics-based speech therapy in accordance with an illustrative embodiment. Application 700 is an example of application 105 in FIG. 1 and executes in device 132 in FIG. 1.

In FIG. 7, report module 710 includes skill scoring module 720. Skill scoring module 720 computes one or more scores for the child's speech skills with respect to corresponding skills of other children having similar profiles. Skill scoring module 720 can be configured to report an overall score representing a composite of all of a child's speech-related skills, a set of scores each representing one of a child's speech-related skills, or both a set of scores and an overall score. Report module 710 reports scores and guidance to the child's parents, teachers, speech therapists, and other caregivers, to help these others encourage the child to practice and improve his or her skills offline.

Figure 8:
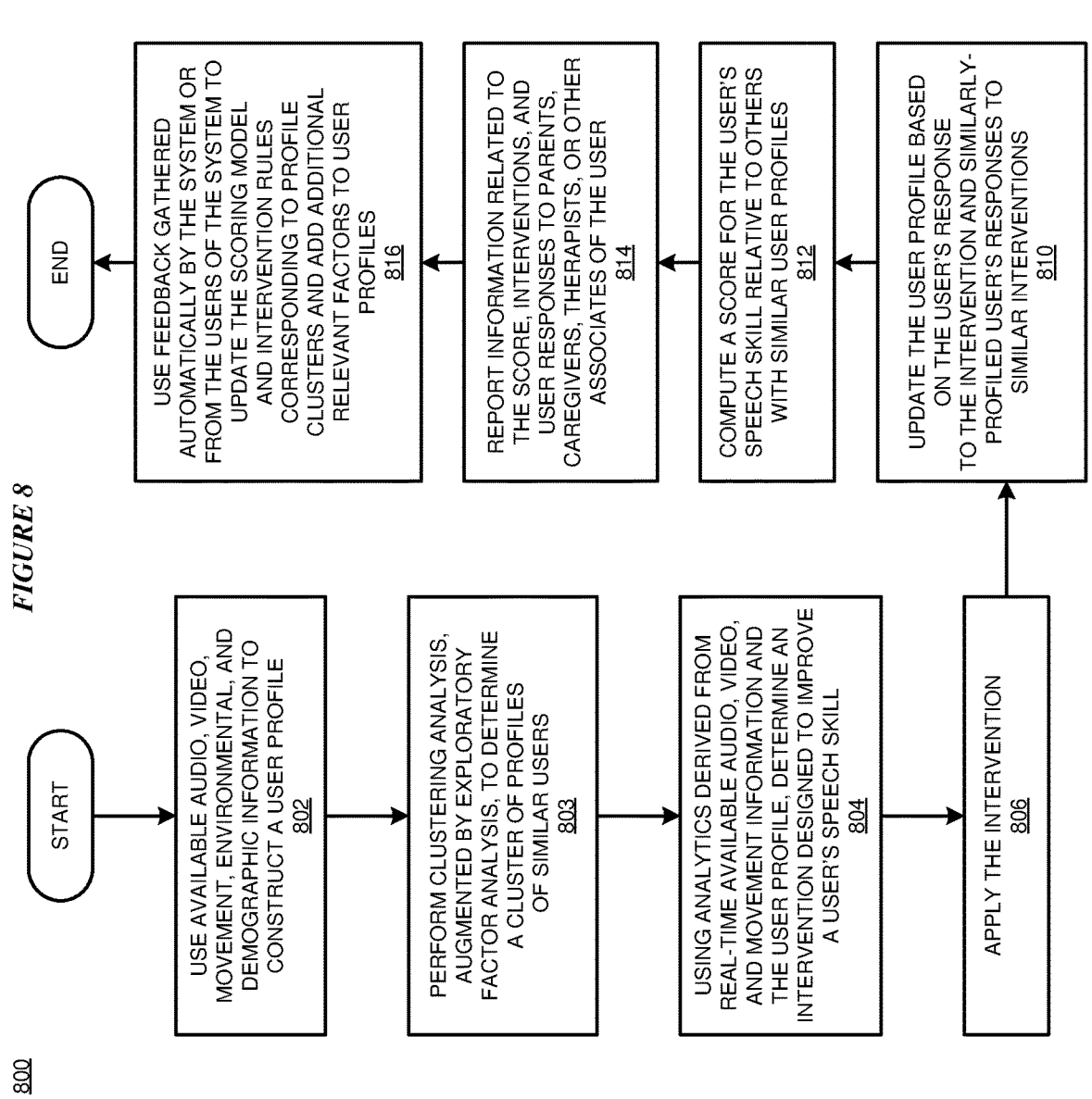
FIG. 8 depicts a flowchart of an example process for analytics-based speech therapy in accordance with an illustrative embodiment.

With reference to FIG. 8, this figure depicts a flowchart of an example process for analytics-based speech therapy in accordance with an illustrative embodiment. Process 800 can be implemented in any of applications 300, 400, 500, 600, and 700 in FIGS. 3, 4, 5, 6, and 7 respectively.

In block 802, the application uses any available audio, video, movement, environmental, and demographic information to construct a user profile for a user of the application. In block 803, the application performs clustering analysis, augmented by exploratory factor analysis, to determine a cluster of profiles of similar users. In block 804, the application uses analytics derived from any available real-time audio, video, and movement information, as well as the user profile, to determine an intervention, or series of interventions, designed to improve a speech or language skill, or a subset of a speech or language skill, of the user. In block 806, the application applies the intervention, by prompting the user using voice, displaying information on a screen, or a combination of voice and screen display. In block 808, the application analyzes any available real-time audio, video, and movement information to determine the user's response to the intervention. In block 810, the application updates the user profile based on the user's response to the intervention as well as similarly-profiled users' responses to similar interventions. In block 812, the application computes one or more scores for the user's speech and language skills relative to others with similar profiles. In block 814, the application reports information related to scores, interventions, and user responses to parents, caregivers, therapists, or other associates of the user, to allow them to provide offline guidance. In block 814, the application uses feedback gathered automatically by the system or from the users of the system to update the scoring model and intervention rules corresponding to profile clusters and add additional relevant factors to user profiles. Then the application ends.

Figure 9:
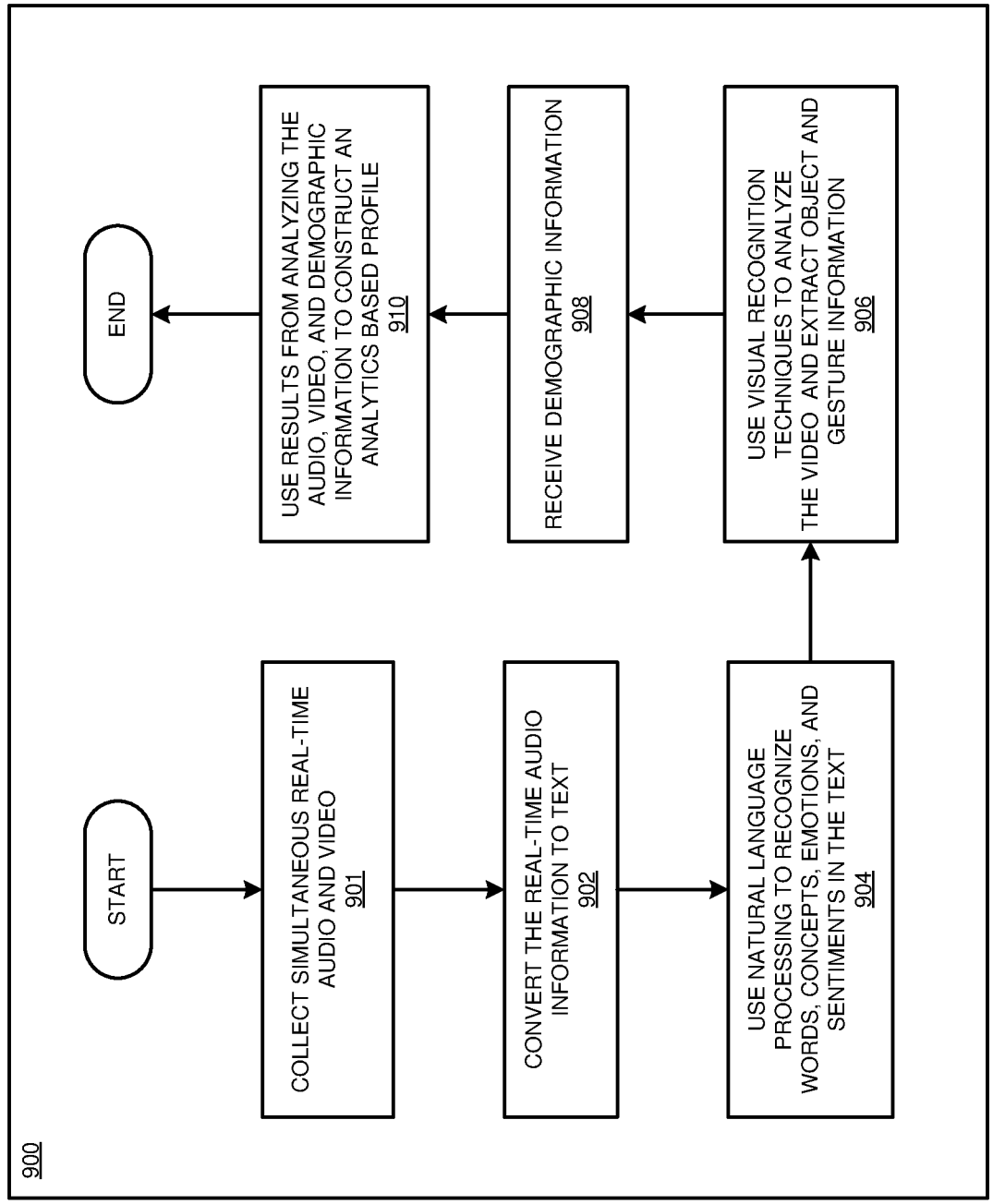
FIG. 9 depicts a flowchart of the profile construction portion of an example process for analytics-based speech therapy in accordance with an illustrative embodiment.

With reference to FIG. 9, this figure depicts a flowchart of the profile construction portion of an example process for analytics-based speech therapy in accordance with an illustrative embodiment. Process 900 is a portion of process 800 in FIG. 8, and can be implemented in any of applications 300, 400, 500, 600, and 700 in FIGS. 3, 4, 5, 6, and 7 respectively.

In block 901, the application collects simultaneous real-time audio and video. In block 902, the application converts the real-time audio information to text, using any suitable speech-to-text technique. In block 904, the application uses natural language processing techniques to recognize words, concepts, emotions, and sentiment in the text. In block 906, the application uses visual recognition techniques to analyze the collected video images and sequences and extract object and gesture information. In block 908, the applications receives demographic information for the user. In block 910, the application uses results from analyzing the audio, video, and demographic information, as well as correlating the audio and video information, to construct an analytics based profile. Then the application ends.

Thus, a computer implemented method, system or apparatus, and computer program product are provided in the illustrative embodiments for analytics-based speech therapy and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method comprising:
constructing, from a set of information obtained about a user, a profile representing a speech skill of the user, the set of information comprising at least one from a group comprising audio, video, and demographic information of the user and other users, the constructing creating new data corresponding to the speech skill of the user in the profile;
triggering automatically, by correlating analytics of new real-time audio information with the new data in the profile, an intervention, the intervention being directed to change in a voice communication pattern of the user;
applying the intervention, the applying comprising converting, to a spoken natural language instruction, the intervention;
analyzing new real-time audio information received in response to the spoken natural language instruction; and
modifying, responsive to the analyzing producing a change in the voice communication pattern of the user greater than a threshold change, a first state of the new data of the profile to a second state in the profile.

2. The method of claim 1, wherein constructing the profile comprises:
converting audio information of the user to text;
classifying, using natural language processing, the text into a set of categories;
extracting, from video information of the user, gesture information of the user;
extracting, from the video information of the user, object information of an environment around the user; and
constructing, using the set of categories, the gesture information, the object information, and the demographic information, the profile.

3. The method of claim 1, wherein applying the intervention further comprises communicating with the user in spoken natural language form.

4. The method of claim 1, wherein applying the intervention further comprises communicating with the user in spoken natural language form and using a display screen.

5. The method of claim 4, wherein communicating with the user using the display screen further comprises interacting with the user via an augmented reality environment displayed on the display screen.

6. The method of claim 1, further comprising:
associating, using clustering analysis, the profile with a set of profiles each representing a user with above a threshold degree of similarity to the user.

7. The method of claim 6, further comprising:
computing a score for the speech skill relative to scores for the speech skill in the set of profiles.

8. The method of claim 7, further comprising:
reporting information regarding the intervention and the score.

9. The method of claim 1, wherein the new real-time audio information further comprises new real-time video information.

10. A computer usable program product comprising one or more computer-readable storage devices, and program instructions stored on at least one of the one or more storage devices, the stored program instructions comprising:
program instructions to construct, from a set of information obtained about a user, a profile representing a speech skill of the user, the set of information comprising at least one from a group comprising audio, video, and demographic information of the user and other users, the constructing creating new data corresponding to the speech skill of the user in the profile;
program instructions to trigger automatically, by correlating analytics of new real-time audio information with the new data in the profile, an intervention, the intervention being directed to change in a voice communication pattern of the user;
program instructions to apply the intervention, the applying comprising converting, to a spoken natural language instruction, the intervention;
program instructions to analyze new real-time audio information received in response to the spoken natural language instruction; and
program instructions to modify, responsive to the analyzing producing the change in a voice communication pattern of the user greater than a threshold change, a first state of the new data of the profile to a second state in the profile.

11. The computer usable program product of claim 10, wherein program instructions to construct the profile further comprises:
program instructions to convert audio information of the user to text;
program instructions to classify, using natural language processing, the text into a set of categories;
program instructions to extract, from video information of the user, gesture information of the user;
program instructions to extract, from the video information of the user, object information of an environment around the user; and
program instructions to construct, using the set of categories, the gesture information, the object information, and the demographic information, the profile.

12. The computer usable program product of claim 10, wherein program instructions to apply the intervention further comprises program instructions to communicate with the user in spoken natural language form.

13. The computer usable program product of claim 10, wherein program instructions to apply the intervention further comprises program instructions to communicate with the user in spoken natural language form and using a display screen.

14. The computer usable program product of claim 13, wherein program instructions to communicate with the user using the display screen further comprises interacting with the user via an augmented reality environment displayed on the display screen.

15. The computer usable program product of claim 10, further comprising:
program instructions to associate, using clustering analysis, the profile with a set of profiles each representing a user with above a threshold degree of similarity to the user.

16. The computer usable program product of claim 15, further comprising:
program instructions to compute a score for the speech skill relative to scores for the speech skill in the set of profiles.

17. The computer usable program product of claim 16, further comprising:
program instructions to report information regarding the intervention and the score.

18. The computer usable program product of claim 10, wherein the computer usable code is stored in a computer readable storage device in a data processing system, and wherein the computer usable code is transferred over a network from a remote data processing system.

19. The computer usable program product of claim 10, wherein the computer usable code is stored in a computer readable storage device in a server data processing system, and wherein the computer usable code is downloaded over a network to a remote data processing system for use in a computer readable storage device associated with the remote data processing system.

20. A computer system comprising one or more processors, one or more computer-readable memories, and one or more computer-readable storage devices, and program instructions stored on at least one of the one or more storage devices for execution by at least one of the one or more processors via at least one of the one or more memories, the stored program instructions comprising:
program instructions to construct, from a set of information obtained about a user, a profile representing a speech skill of the user, the set of information comprising at least one from a group comprising audio, video, and demographic information of the user and other users, the constructing creating new data corresponding to the speech skill of the user in the profile;
program instructions to trigger automatically, by correlating analytics of new real-time audio information with the new data in the profile, an intervention instruction, the intervention being directed to change in a voice communication pattern of the user;
program instructions to apply the intervention, the applying comprising converting, to a spoken natural language instruction, the intervention;
program instructions to analyze new real-time audio information received in response to the spoken natural language instruction; and
program instructions to modify, responsive to the analyzing producing a change in the voice communication pattern of the user greater than a threshold change, a first state of the new data of the profile to a second state in the profile.

* * * * *